(12) United States Patent
Stoye et al.

(10) Patent No.: US 10,290,132 B2
(45) Date of Patent: May 14, 2019

(54) GRAPHICS PROCESSING

(71) Applicant: ARM Limited, Cambridge (GB)

(72) Inventors: William Robert Stoye, Cambridge (GB); Samuel Martin, Waterbeach (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/075,465

(22) Filed: Mar. 21, 2016

(65) Prior Publication Data

US 2016/0284043 A1  Sep. 29, 2016

(30) Foreign Application Priority Data

Mar. 25, 2015 (GB) .................................. 1505067.7
Nov. 25, 2015 (GB) .................................. 1520798.8

(51) Int. Cl.
*G06T 1/20* (2006.01)
*G06T 1/60* (2006.01)
*G06T 11/40* (2006.01)

(52) U.S. Cl.
CPC ................ *G06T 11/40* (2013.01); *G06T 1/60* (2013.01); *G06T 1/20* (2013.01)

(58) Field of Classification Search
None
See application file for complete search history.

(56) References Cited

U.S. PATENT DOCUMENTS

2004/0267824 A1* 12/2004 Pizzo ................ G06F 17/30902
2007/0101013 A1   5/2007 Howson
2013/0173662 A1*  7/2013 Kaplinger ......... G06F 17/30463
                                                    707/774
2014/0053070 A1*  2/2014 Powers ................. G06F 3/0484
                                                    715/708
2014/0118352 A1*  5/2014 Hakura ................ G06T 15/005
                                                    345/426
2014/0375663 A1  12/2014 Pfaffe
(Continued)

FOREIGN PATENT DOCUMENTS

EP    1001369    6/2000
GB    1551229    8/1979
(Continued)

OTHER PUBLICATIONS

GB Search Report dated Sep. 7, 2015, GB Patent Application No. GB1505067.7.

(Continued)

*Primary Examiner* — YuJang Tswei
(74) *Attorney, Agent, or Firm* — Vierra Magen Marcus LLP

(57) ABSTRACT

A graphics processor performs interleaved graphics processing wherein the interleaved graphics processing comprises performing one or more processing operations to generate one or more sub-regions of a first set of graphics data, and performing one or more further processing operations to generate one or more sub-regions of a second set of graphics data that are dependent on the one or more sub-regions of the first set of graphics data prior to performing one or more processing operations to generate one or more further sub-regions of the first set of graphics data.

21 Claims, 5 Drawing Sheets

(56) References Cited

U.S. PATENT DOCUMENTS

2016/0034401 A1* 2/2016 Serebrin ............... G06F 12/123
    711/125
2016/0094854 A1* 3/2016 Wozniak ................ H04N 19/44
    375/240.25

FOREIGN PATENT DOCUMENTS

| JP | S63-201779 | 8/1988 |
| JP | S63-201784 | 8/1998 |

OTHER PUBLICATIONS

"Particle Shadows & Cache-Efficient Post-Processing", Louis Bavoil & Jon Jansen, Mar. 2013, available at: https://developer.nvidia.com/sites/default/files/akamai/BAVOIL_ParticleShadowsAndCacheEfficientPost.pdf, accessed Apr. 6, 2016.
"Gramps: A Programming Model for Graphics Pipelines", Jeremy Sugerman, Kayvon Fatahalian, and Solomon Boulos, ACM Transactions on Graphics, vol. 28, No. 1, Article 4, Jan. 2009, available at: http://graphics.stanford.edu/papers/gramps-tog/gramps-tog09.pdf, accessed Apr. 6, 2016.
GB Combined Search and Examination Report dated Apr. 13, 2016, GB Patent Application No. GB1520798.8.

* cited by examiner

GRAPHICS PROCESSING

BACKGROUND

The technology described herein relates to a method of graphics processing and to a graphics processor for a graphics processing system.

Many popular graphics processing systems use plural buffers, e.g. frame buffers, to produce a final output (e.g. image or texture). For example, a first set of graphics data may be generated by a processor and then written to a buffer in external (e.g. main or off-chip) memory. The buffer containing the first set of graphics data may then be read back, some further processing may be carried out on the first set of graphics data by the processor and the resultant second set of graphics data may be written back to a further buffer in external memory. In many cases, this may occur multiple times prior to the generation of the final output as multiple processing steps are required. The time, memory bandwidth and power required to retrieve graphics data from a buffer and write back to a (subsequent) buffer after each processing step may be significant.

The Applicants accordingly believe that there remains scope for improvements to graphics processing methods and graphics processors that perform multiple processing steps.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
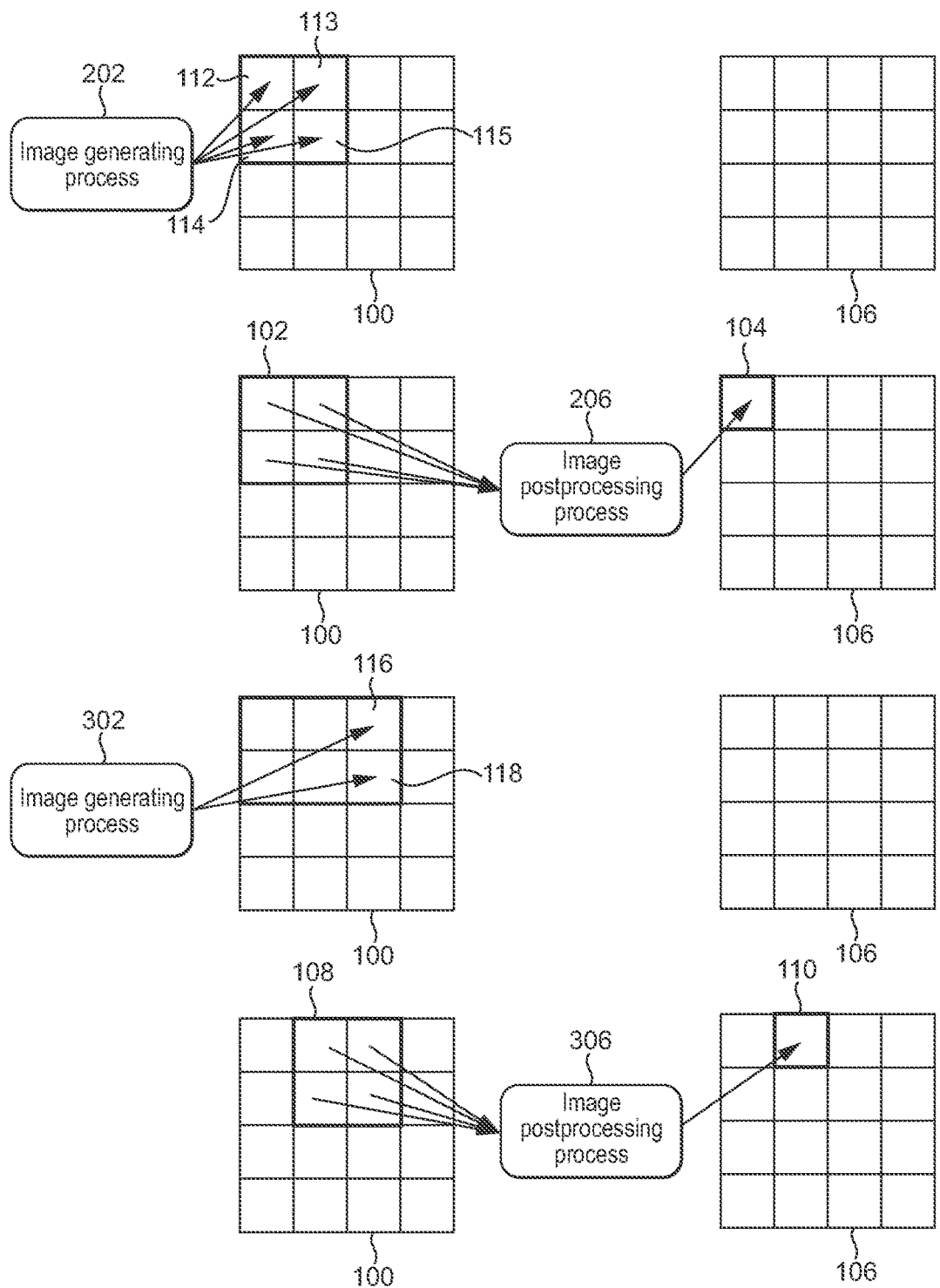
FIG. 1 is a schematic diagram that illustrates a method of performing interleaved graphics processing.

An embodiment of the technology described herein comprises a method of graphics processing that comprises:

performing one or more processing operations to generate one or more sub-regions of a first set of graphics data; and performing one or more further processing operations to generate one or more sub-regions of a second set of graphics data that are dependent on the one or more sub-regions of the first set of graphics data prior to performing one or more processing operations to generate one or more further sub-regions of the first set of graphics data.

Another embodiment of the technology described herein comprises a graphics processor for a graphics processing system, the graphics processor comprising:

processing circuitry configured to perform one or more processing operations to generate one or more sub-regions of a first set of graphics data;

wherein the processing circuitry is further configured to perform one or more further processing operations to generate one or more sub-regions of a second set of graphics data that are dependent on the one or more sub-regions of the first set of graphics data prior to performing one or more processing operations to generate one or more further sub-regions of the first set of graphics data.

In the technology described herein, one or more processing operations (e.g. rendering operations) are performed so as to generate a first set of graphics data and one or more further graphics processing operations (e.g. post processing operations) are performed so as to generate a second set of graphics data that is dependent on (that uses) the first set of graphics data. Thus, in the technology described herein, plural graphics processing steps are performed in respect of the graphics data. However, rather than generating all of the first set of graphics data prior to generating the second set of graphics data, the technology described herein comprises generating one or more sub-regions of the first set of graphics data, then generating one or more sub-regions of the second set of graphics data that are dependent on (that use) those one or more sub-regions of the first set of graphics data, and thereafter generating one or more further sub-regions of the first set of graphics data.

Thus, in the technology described herein, the process of generating the second set of graphics data commences earlier than would be the case if all of the first set of graphics data were to be generated in advance. Furthermore, since not all of the first set of graphics data is generated prior to generating the second set of graphics data, the technology described herein can reduce the amount of graphics data that needs to be stored at any one time for use when generating the second set of graphics data.

Embodiments of the technology described herein subsequently comprise performing the one or more processing operations to generate the one or more further sub-regions of the first set of graphics data. Embodiments of the technology described herein may then comprise performing one or more further processing operations to generate one or more further sub-regions of the second set of graphics data that are dependent on the one or more further sub-regions of the first set of graphics data. The process of performing the one or more further processing operations to generate the one or more further sub-regions of the second set of graphics data that are dependent on the one or more further sub-regions of the first set of graphics data may again be performed prior to performing one or more processing operations to generate one or more yet further sub-regions of the first set of graphics data and/or prior to performing one or more further processing operations to generate one or more yet further sub-regions of the second set of graphics data that are dependent on the one or more yet further sub-regions of the first set of graphics data.

Thus, in embodiments, the process of generating a first set of graphics data is interleaved with the process of generating a second set of graphics data that is dependent on (that uses) the first set of graphics data. It will therefore be appreciated that embodiments of the technology described herein comprise repeating (in respect of successive groups of one or more sub-regions) the sequential steps of: i) performing one or more processing operations to generate one or more sub-regions of a first set of graphics data; and ii) performing one or more further processing operations to generate one or more sub-regions of a second set of graphics data using the one or more sub-regions of the first set of graphics data. The steps i) and ii) may be repeated (in respect of successive groups of one or more sub-regions) until the desired number, e.g. the majority or substantially all, of the sub-regions of the first and/or second set of graphics data have been generated.

The one or more sub-regions of the first set of graphics data on which the one or more sub-regions of the second set of graphics data are dependent may be output to external memory and then accessed therefrom (e.g. read back) in order to generate the one or more sub-regions of the second set of graphics data. As will be appreciated, the external memory is in an embodiment external to the processing circuitry that performs the processing operations and may be referred to herein as being "off-chip" or "main" memory. Thus, the graphics processing system may further comprise external memory (that may form part of an external memory system) configured to store one or more sub-regions of the first set of graphics data on which one or more sub-regions of the second set of graphics data are dependent. The external memory is also in an embodiment configured to store one or more sub-regions of the second set of graphics data. The external memory may comprise one or more buffers, such as one or more frame buffers. Any of the operations that involve the external memory described herein may be, at least in part, under the control of an external memory controller for the graphics processing system. Thus, the graphics processing system may further comprise an external memory controller (that may form part of an external memory system). As will be appreciated, despite reading back the one or more sub-regions of the first set of graphics data from external memory, these embodiments are still advantageous in that, as discussed above, the process of generating the second set of graphics data can commence earlier than would be the case if all of the first set of graphics data were to be generated in advance.

However, in embodiments, the one or more sub-regions of the first set of graphics data on which the one or more sub-regions of the second set of graphics data are dependent are stored in local memory. As will be appreciated, the local memory is in an embodiment local to the processing circuitry that performs the processing operations and may be referred to herein as "on-chip" memory. Thus, the graphics processor in an embodiment further comprises a local memory configured to store one or more sub-regions of the first set of graphics data on which one or more sub-regions of the second set of graphics data are dependent. The local memory may comprise one or more caches. Any of the operations that involve the local memory described herein may be, at least in part, under the control of a local memory (cache) controller for the graphics processor. Thus, the graphics processor may further comprise a local memory (cache) controller (that may form part of the processing circuitry of the graphics processor). These embodiments can significantly reduce the time, memory bandwidth and power needed to generate the second set of graphics data by reducing or avoiding the need for external memory accesses when generating the second set of graphics data using the first set of graphics data.

The local memory is in an embodiment large enough to store some, but not all, of the first set of graphics data. Thus, the local memory need not have sufficient capacity to store all of the first set of graphics data. These embodiments limit the amount of local memory available to generate the second set of graphics data. As will be appreciated, being able to make use of a smaller local memory in this way is made possible in the technology described herein because, as discussed above, a lesser amount of the first set of graphics data is generated, and therefore needs to be stored locally, prior to generating the one or more sub-regions of the second set of graphics data.

In some embodiments (e.g. in which the one or more sub-regions of the first set of graphics data are needed for later purposes, i.e. in addition to generating the one or more sub-regions of the second set of graphics data), the one or more sub-regions of the first set of graphics data may be stored in external memory in addition to being stored in the local memory. However, in other embodiments (e.g. in which one or more sub-regions of the first set of graphics data are no longer needed once they have been used to generate one or more sub-regions of the second set of graphics data (e.g. the first set of graphics data merely comprises an "intermediate" set of graphics data)), one or more sub-regions of the first set of graphics data may (only) be stored in the local memory and may not be stored in external memory. In these embodiments, one or more sub-regions of the first set of graphics data on which one or more sub-regions of the second set of graphics data are dependent may be (permanently) prevented from being written to external memory. This can reduce the amount of memory bandwidth consumed by the graphics processor by avoiding memory accesses to write the one or more sub-regions of the first set of graphics data on which the one or more sub-regions of the second set of graphics data are dependent to external memory.

One or more sub-regions of the first set of graphics data on which one or more sub-regions of the second set of graphics data are dependent may be removed from the local memory once the one or more processing operations to generate those one or more sub-regions of the second set of graphics data have been completed (e.g. substantially immediately after all of the sub-regions of the second set of graphics data that depend on those one or more sub-regions of the first set of graphics data have been generated). Similarly, one or more sub-regions of the first set of graphics data on which one or more sub-regions of the second set of graphics data are dependent may be removed from the local memory prior to performing one or more processing operations to generate one or more further sub-regions of the first set of graphics data and/or prior to performing one or more further processing operations to generate one or more further sub-regions of the second set of graphics data that are dependent on the one or more further sub-regions of the first set of graphics data. These embodiments can limit the amount of data that is stored at any one time.

The processing order when generating the first set of graphics data and/or the second set of graphics data may follow any desired and suitable processing path(s) (e.g. space filling curve(s)) over the sub-regions of the first set of graphics data and/or over the sub-regions of the second set of graphics data.

In some embodiments, the one or more processing paths may comprise one or more serpentine paths (e.g. up and down columns of sub-regions or back and forth along rows of sub-regions). As will be appreciated, a serpentine path differs from a raster path in that a serpentine path proceeds in a first direction (e.g. down a column or left to right along a row) and then proceeds in a second counter/opposite direction (e.g. up the next column or right to left along the next row), whereas a raster path always proceeds in the same direction (e.g. down each column or left to right along each row).

The one or more processing paths may also progress in a serpentine manner along strips of the graphics data (e.g. back and forth along strips of the graphics data or up and down strips of the graphics data). The strips may be plural or S sub-regions wide, where S is a positive integer greater than 1. For example, S may be an integer in the range 2-20.

In other embodiments, the one or more processing paths may comprise a raster path, a z-ordered or Morton ordered path, a Hilbert ordered path, etc. over the sub-regions of the first set of graphics data and/or over the sub-regions of the second set of graphics data.

The path followed when generating the first set of graphics data (and in an embodiment when storing the first set of graphics data in the local memory) may be the same as, or may be different to, the path followed when generating the second set of graphics data. The path followed when generating the first set of graphics data (and in an embodiment when storing the first set of graphics data in the local memory) may start at the same place (e.g. with the same sub-region) as, or at a different place (e.g. with a different sub-region) to, the path followed when generating the second set of graphics data. The same path and/or starting point or a different path and/or starting point may be followed when removing the first set of graphics data from the local memory.

In some embodiments, a first path is followed when generating the first set of graphics data (and in an embodiment when storing the first set of graphics data in the local memory) and a second different (e.g. opposite/counter) path is followed when generating the second set of graphics data. In these embodiments, the second path may have a different starting point and/or is offset with respect to the first path. The first path, the second path, or a third different path, may be followed when removing the first set of graphics data from the local memory. In embodiments, a third different path (in an embodiment offset from, but in the same direction as, the first path) is followed when removing the first set of graphics data from the local memory. The third path in an embodiment has the same starting point as the first path. These embodiments have been found to be particularly efficient for some types of further processing operations, for example where the sub-regions of the second set of graphics data are dependent on a group (e.g. a kernel) of plural sub-regions of the first set of graphics data, e.g. where those plural sub-regions are not adjacent one another along the first path.

In some embodiments, the processing order may be fixed for the graphics processor and/or for the graphics processing method being performed. Some embodiments may comprise determining the particular processing order to use for generating the first set of graphics data and/or the second set of graphics data. This may be achieved in any desired and suitable way. In some embodiments, the processing order to use may be derived from the particular dependency between the first set of graphics data and the second set of graphics data.

In some embodiments, the dependency between the first set of graphics data and the second set of graphics data may be fixed for the graphics processor and/or for the graphics processing method being performed. Some embodiments may comprise determining the particular dependency between the first set of graphics data and the second set of graphics data. Again, this may be achieved in any desired and suitable way. For example, the dependency may be explicitly specified, e.g. in firmware or software, or may be inferred, e.g. from the type of further processing operations and/or parameters (kernel size) for performing the further processing operations. The dependency may be determined and/or indicated by (e.g. a driver of) the graphics processing system (e.g. using an API extension) and/or may be determined by (e.g. dependency identification circuitry of) the processing circuitry of the graphics processor (e.g. using a program (e.g. shader) extension).

There may be any desired and suitable dependency between the sub-regions of the first set of graphics data and the sub-regions of the second set of graphics data. There may, for example, be a 1:1 dependency. Alternatively, there may be an N:1 dependency or a 1:N dependency, where N may be a positive integer greater than 1. N may be a square number, for example 4, 9, etc. For example, where there is an N:1 dependency between the sub-regions of the first set of graphics data and the sub-regions of the second set of graphics data, a sub-region in the second set of graphics data may be dependent on a (e.g. square) group (e.g. a kernel) of N sub-regions in the first set of graphics data.

As will be appreciated, the first set of graphics data and/or second set of graphics data in an embodiment comprises an array of data positions for the desired output (e.g. image or texture). For example, the array of data positions may correspond to sampling positions for an image (e.g. sampling positions for sub-pixels or pixels of the image) or texture (e.g. sampling positions for sub-texels or texels of the texture). The sub-regions of the first and/or second set of graphics data can be any desired and suitable size or shape in terms of the data (sampling) positions, but are in an embodiment rectangular (including square), and in embodiments 8×8, 16×16 or 32×32 data (sampling) positions in size.

In an embodiment, each sub-region of the first and/or second set of graphics data corresponds to one or more processing tiles that the desired output (e.g. image or texture) is divided into for processing purposes, for example to one or more tiles that the graphics processing method or graphics processor operates on and produces as its output. In these embodiments, the tiles that the desired output (e.g. image or texture) is divided into can be any desired and suitable size or shape, but are in an embodiment of the form discussed above (thus in an embodiment rectangular (including square), and in embodiments 8×8, 16×16 or 32×32 data (sampling) positions in size). A sub-region of the first set of graphics data and/or a sub-region of the second set of graphics data may correspond to a single processing tile, may be made up of a set of plural processing tiles, or may comprise only a portion of a processing tile.

There may be any desired and suitable mapping between the number of sub-regions and/or data (sampling) positions in the first set of graphics data and the number of sub-regions and/or data (sampling) positions in the second set of graphics data. For example, there may be a 1:1 mapping. Alternatively, there may be an M:1 mapping (e.g. for down-sampling) or a 1:M mapping (e.g. for up-sampling), where M may be a positive integer greater than 1. The first set of graphics data and the second set of graphics data may accordingly be different sizes or may be the same size in terms of number of sub-regions and/or data (sampling) positions. The sub-regions and/or data (sampling) positions of the first set of graphics data may be mapped to corresponding (e.g. corresponding in terms of position within the desired output (e.g. image or texture)) sub-regions and/or data (sampling) positions of the second set of graphics data.

The interleaved steps of embodiments of the technology described herein may be co-ordinated in any desired and suitable way. For example, embodiments may comprise determining when one or more sub-regions of the first set of graphics data on which one or more sub-regions of the second set of graphics data are dependent have been generated. These embodiments may then comprise, responsive to determining that those one or more sub-regions of the first set of graphics data have been generated, commencing one or more further processing operations to generate the one or more sub-regions of the second set of graphics data.

Similarly, embodiments may comprise determining when one or more sub-regions of the second set of graphics data that are dependent on one or more sub-regions of the first set of graphics data have been generated. These embodiments may then comprise, responsive to determining that those one or more sub-regions of the second set of graphics data have been generated, commencing the generation of one or more further sub-regions of the first set of graphics data.

Similarly, embodiments may comprise determining when one or more (e.g. all of the) sub-regions of the second set of graphics data that are dependent on one or more sub-regions of the first set of graphics data have been generated. These embodiments may then comprise, responsive to determining that those one or more sub-regions of the second set of graphics data have been generated, commencing the removal of the one or more sub-regions of the first set of graphics data from the local memory.

Operation in an interleaved manner (rather than a conventional sequential manner) may also be initiated and/or terminated in any desired and suitable way. For example, operation in an interleaved manner may be initiated when there is sufficient (local) memory capacity available and/or may be terminated when there is insufficient (local) memory capacity available (e.g. in an ad-hoc or "greedy" manner). Alternatively, operation in an interleaved manner may be initiated for particular (e.g. selected and/or predetermined) series of graphics processing steps (e.g. graphics processing steps that are more likely to benefit from interleaved operation such as graphics processing steps that would otherwise use many/large buffers) and/or may be terminated for other particular (e.g. selected and/or predetermined) series of graphics processing steps (e.g. in a planned or "heuristic" manner).

The processing operations to generate the one or more sub-regions of the first set of graphics data may be any desired and suitable processing operations. For example, the processing operations may comprise rendering operations or post-processing operations. The rendering operations may comprise 2D rendering operations and/or 3D rendering operations. The post processing operations may comprise one or more of: compression, decompression, encoding, decoding, filtering, and scaling. The post processing operations may comprise one or more of: antialiasing, bloom, blur, colour correction, contrast enhancement, crease, depth of field, edge-detection, fish-eye lens effect, fog effects, glow, grayscale, noise and grain effects, screen overlays, sepia toning, lighting, screen space ambient occlusion, tilt shift, tone mapping, vignetting, chromatic aberration, down-sampling, up-sampling, local sampling, and re-projection. The one or more processing operations that generate the one or more sub-regions of the first set of graphics data may be performed by image processing circuitry and/or intermediate data generation circuitry of the (processing circuitry of the) graphics processor.

The further processing operations to generate the one or more sub-regions of the second set of graphics data may also be any desired and suitable further processing operations. For example, the further processing operations may comprise (further) rendering operations or (further) post-processing operations. The (further) rendering operations may comprise (further) 2D rendering operations and/or (further) 3D rendering operations. The (further) post processing operations may comprise one or more of: compression, decompression, encoding, decoding, filtering, and scaling. The (further) post processing operations may comprise one or more of: antialiasing, bloom, blur, colour correction, contrast enhancement, crease, depth of field, edge-detection, fish-eye lens effect, fog effects, glow, grayscale, noise and grain effects, screen overlays, sepia toning, lighting, screen space ambient occlusion, tilt shift, tone mapping, vignetting, chromatic aberration, down-sampling, up-sampling, local sampling, and re-projection. The one or more further processing operations to generate the one or more sub-regions of the second set of graphics data may again be performed by image processing circuitry and/or intermediate data generation circuitry of the (processing circuitry of the) graphics processor.

Embodiments may further comprise performing one or more yet further processing operations in one or more further processing steps to generate one or more further sets of graphics data. The one or more yet further processing operations may be any one or more of the processing operations described above. These embodiments may again comprise interleaving the processes of generating the sets of graphics data. For example, embodiments may comprise performing one or more yet further processing operations to generate one or more sub-regions of a third set of graphics data that are dependent on the one or more sub-regions of the first and/or second set of graphics data: prior to performing the one or more processing operations to generate the one or more further sub-regions of the first set of graphics data, and/or prior to performing one or more further processing operations to generate one or more further sub-regions of the second set of graphics data.

For example, where three sets of graphics data are to be generated, embodiments may comprise repeating (in respect of successive groups of one or more sub-regions) the sequential steps of: i) performing one or more processing operations to generate one or more sub-regions of the first set of graphics data (with the one or more sub-regions of the first set of graphics data in an embodiment being stored in local memory); ii) performing one or more further processing operations to generate one or more sub-regions of the second set of graphics data using the one or more sub-regions of the first set of graphics data and performing one or more yet further processing operations to generate one or more sub-regions of a third set of graphics data using the one or more sub-regions of the first set of graphics data (with one or more sub-regions of the first set of graphics data in an embodiment then being removed from the local memory). The steps i) and ii) may be repeated (in respect of successive groups of one or more sub-regions) until the desired number of, e.g. the majority or substantially all, of the sub-regions of the first, second and/or third set of graphics data have been generated.

In another example, where three sets of graphics data are to be generated, embodiments may comprise repeating (in respect of successive groups of one or more sub-regions) the sequential steps of: i) performing one or more processing operations to generate one or more sub-regions of the first set of graphics data (with the one or more sub-regions of the first set of graphics data in an embodiment being stored in local memory); ii) performing one or more further processing operations to generate one or more sub-regions of the second set of graphics data using the one or more sub-regions of the first set of graphics data (with one or more sub-regions of the first set of graphics data in an embodiment then being removed from the local memory and/or with the one or more sub-regions of the second set of graphics data in an embodiment being stored in the local memory); and iii) performing one or more further processing operations to generate one or more sub-regions of a third set of graphics data using the one or more sub-regions of the second set of graphics data (with one or more sub-regions of the second set of graphics data in an embodiment then being removed from the local memory). The steps i), ii) and iii) may be repeated (in respect of successive groups of one or more sub-regions) until the desired number of, e.g. the majority or substantially all, of the sub-regions of the first, second and/or third set of graphics data have been generated.

The above examples may also be extended to any desired and suitable number of interleaved processing steps in which any desired and suitable number of sets of graphics data are generated.

The one or more of the sets of graphics data which are generated (e.g. the first set, second set, third set, etc.) may be output to external memory, e.g. for display or for later use as a texture. However, as indicated above, some sets of graphics data that have been used to generate one or more other sets of graphics data but which are then not required (e.g. comprising merely "intermediate" sets of graphics data) need not be, and may be prevented from being, output to external memory. As indicated above, this can reduce the amount of memory bandwidth needed to generate the final graphics data to be output.

The sets of graphics data described herein may comprise, and may be referred to herein as, "image data". The sets of graphics data may comprise any desired and suitable data that relates to a desired output (e.g. image or texture) to be generated. For example, the graphics data may comprise one or more of: colour (RGB) data, transparency (a) data, depth (z) data, etc., or may comprise graphics data that can be used to derive, or is derivable from, such graphics data, such as compressed graphics data or encoded graphics data. The graphics processor may comprise one or more graphics processing units (GPUs) and/or may comprise one or more central processing units (CPUs).

Another embodiment comprises a method that comprises; receiving a first set of image data; performing one or more processing operations to generate one or more sub-regions of the first set of image data; performing one or more further processing operations to generate one or more sub-regions of a second set of image data that are dependent on the one or more sub-regions of the first set of image data prior to performing one or more processing operations on one or more further sub-regions of the first set of image data.

The method may further comprise storing the one or more sub-regions of the first set of image data that the one or more sub-regions of the second set of image data are dependent on in a local cache; and removing the one or more sub-regions of the first set of image data from the local cache once processing of the one or more sub-regions of the second set of image data that are dependent on the sub-region of the first set of image data has been completed.

The sub-regions may each comprise a plurality of associated image pixels.

The one or more identified dependencies may comprise a similarity measure. The similarity measure may be selected from one or more of pixel location, colour and depth.

The first set of image data and the second set of image data may be different sizes.

The method may comprise: generating from the first set of image data one or more sets of intermediate data, the intermediate data comprising a plurality of sub-regions; and identifying one or more sub-regions of a second set of image data that are dependent on one or more sub-regions of one or more sets of intermediate data.

The method may comprise further comprise: storing the one or more sub-regions of the one or more sets of intermediate data in a local cache; and removing the one or more sub-regions of the one or more sets of intermediate data once processing of the one or more sub-regions of the second set of image data has been completed.

Performing one or more processing operations to generate one or more sub-regions of the first set of image data may comprise one or more of 2D rendering, 3D rendering, post-processing operations.

The one or more further processing operations may comprise applying one or more post-processing operations.

The one or more processing operations and one or more further processing operations may be selected from at least one of; antialiasing, bloom, blur, colour correction, contrast enhancement, crease, depth of field, edge-detection, fish-eye lens effect, fog effects, glow, grayscale, noise and grain effects, screen overlays, sepia toning, lighting, screen space ambient occlusion, tilt shift, tone mapping, vignetting, chromatic aberration, down-sampling, up-sampling, local sampling, re-projection.

The processing order for the sub-regions of the first and second set of image data may be explicitly specified.

The processing order for the sub-regions of the first and second set of image data may be based upon a greedy allocation policy.

The processing order for the sub-regions of the first and second set of image data may be determined heuristically.

Another embodiment comprises an apparatus that comprises; a plurality of buffers arranged to store image data; image processing circuitry arranged to perform one or more processing operations to generate one or more sub-regions of the first set of image data; and wherein the image processing circuitry is further arranged to perform one or more further processing operations to generate one or more sub-regions of a second set of image data that are dependent on the one or more sub-regions of the first set of image data prior to performing one or more processing operations on one or more further sub-regions of the first set of image data.

The apparatus may further comprise a cache arranged to store the sub-regions of the first set of image data; and cache control circuitry arranged to remove the sub-region of the first set of image data from the cache once processing of the one or more sub-regions of the second set of image data that are dependent on the sub-region of the first set of image data has been completed.

The apparatus may further comprise dependency identification circuitry arranged to identify one or more sub-regions of a second set of image data that are dependent on the sub-region of the first set of image data.

The image processing circuitry may be further arranged to perform one or more further processing operations to generate one or more sub-regions of a plurality of sets of image data that are dependent on the one or more sub-regions of the first set of image data prior to performing one or more processing operations on one or more further sub-regions of the first set of image data.

The apparatus may further comprise intermediate data generation circuitry arranged to generate from the first set of image data one or more sets of intermediate data, the intermediate data comprising a plurality of sub-regions; wherein the image processing circuitry is further arranged to perform one or more further processing operations to generate one or more sub-regions of a second or plurality of sets of image data that are dependent on the one or more sub-regions of the intermediate set of image data prior to performing one or more processing operations on one or more further sub-regions of the first set of image data.

The cache may be further arranged to store the one or more sub-regions of the one or more sets of intermediate data in a local cache; and the cache control circuitry may be further arranged to remove the one or more sub-regions of the one or more sets of intermediate data once processing of the one or more sub-regions of the second set of image data has been completed.

The image processing circuitry may be arranged to execute one or more processing operations selected from at least one of; antialiasing, bloom, blur, colour correction, contrast enhancement, crease, depth of field, edge-detection, fish-eye lense effect, fog effects, glow, grayscale, noise and grain effects, screen overlays, sepia toning, lighting, screen space ambient occlusion, tilt shift, tone mapping, vignetting, chromatic aberration, down-sampling, up-sampling, local sampling, reprojection.

As will be appreciated by those skilled in the art, the graphics processor of the technology described herein may be part of an overall graphics processing system that includes, for example, a host processor. The host processor may, for example, execute applications that require graphics processing by the graphics processor. The host processor may send appropriate commands and data to the graphics processor to control it to perform graphics processing operations and to produce a graphics processing output required by applications executing on the host processor. To facilitate this, the host processor may execute a driver for the graphics processor and/or may execute a compiler or compilers for compiling shader programs to be executed by one or more programmable execution units of the graphics processor.

The graphics processing system may also comprise, and/or may be in communication with, one or more memories (e.g. buffers such as framebuffers) and/or memory devices (e.g. memory controllers) that store the graphics data output by the graphics processor, and/or store software for performing the processes described herein. The graphics processing system may also comprise, and/or may be in communication with, a host microprocessor, and/or a display for displaying images based on the graphics data output by the graphics processor.

The technology described herein can be used for all forms of output that a graphics processor may be used to generate, such as frames for display, render-to-texture outputs, etc. The final output graphics data from the graphics processing is in an embodiment exported to external memory, for storage and use, such as to a (frame) buffer for a display.

In some embodiments, the graphics processor comprises, and/or is in communication with, one or more memories and/or memory devices that store the data described herein, and/or store software for performing the processes described herein. The graphics processor may also be in communication with a host microprocessor, and/or with a display for displaying images based on the data generated by the graphics processor.

The technology described herein is applicable to any suitable form or configuration of graphics processor, and is particularly but not exclusively applicable to tile-based graphics processors.

In an embodiment, the various functions of the technology described herein are carried out on a single graphics processing platform that generates and outputs graphics data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Thus, for example, the processing circuitry may comprise plural separate functional units, operating in parallel. Equally, the various processing stages may share processing circuitry, etc., if desired.

Subject to any hardware necessary to carry out the specific functions discussed above, the graphics processor can otherwise include any one or more or all of the usual functional units, etc., that graphics processors include.

The various graphics processing stages can accordingly be implemented as desired and in any suitable manner, and can perform any desired and suitable functions, respectively. Similarly, the various graphics data can be defined and stored in any suitable and desired manner.

It will also be appreciated by those skilled in the art that all of the described embodiments of the technology described herein can, and in some embodiments do, include, as appropriate, any one or more or all of the optional features described herein. For example, even if not explicitly stated, the graphics processor (e.g. the processing circuitry, etc., of the graphics processor) or graphics processing system may, unless otherwise stated, be configured to perform any step or steps of the method as described herein in relation to any embodiment. Similarly, even if not explicitly stated, the method may comprise performing any step of steps that the graphics processor (e.g. the processing circuitry, etc., of the graphics processor) or graphics processing system, as described herein in relation to any embodiment, is configured to perform.

The methods in accordance with the technology described herein may be implemented at least partially using software e.g. computer programs. Thus, further embodiments comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

The detailed description provided below in connection with the appended drawings is intended as a description of the functions of the present examples and the sequence of steps for constructing and operating the present examples. It is not intended to represent the only forms in which the present examples may be constructed or utilized. However, the same or equivalent functions and sequences may be accomplished by different examples.

As discussed above, in the technology described herein a second set of graphics data is generated that is dependent on (that uses) a first set of graphics data. However, rather than generating all of the first set of graphics data prior to generating the second set of graphics data, the technology described herein comprises generating one or more sub-regions of the first set of graphics data, then generating one or more sub-regions of the second set of graphics data that are dependent on the one or more sub-regions of the first set of graphics data, and thereafter generating one or more further sub-regions of the first set of graphics data. This interleaved graphics processing allows the process of generating the second set of graphics data to commence earlier than would be the case if all of the first set of graphics data were to be generated in advance. The interleaved graphics processing can also reduce the amount of the first set of graphics data that needs to be stored at any one time for use when generating the second set of graphics data.

FIG. 1 is a schematic diagram that illustrates a method of performing interleaved graphics processing in accordance with one embodiment of the technology described herein, wherein partial processing is carried out to generate a second set of graphics data 106 prior to the completion of the generation of a first set of graphics data 100. The steps of the method are shown in more detail in FIGS. 2 and 3.

In this embodiment the first set of graphics data 100 is generated by a graphics processor (e.g. a Graphics Processing Unit, Central Processing Unit or other appropriate processing hardware). The first set of graphics data 100 may be any suitable form of graphics data, for example; 2 dimensional data, 3 dimensional data, a cube map, a depth map etc. In this embodiment, the first set of graphics data 100 is generated and processed as plural sub-regions (shown as sixteen squares in FIG. 1). In this embodiment, each sub-region corresponds to a processing tile as used by a tile based renderer. Each sub-region comprises 32×32 data positions, with each of the data positions corresponding to a pixel in the final output to be generated. However, it will be understood that a sub-region of a set of graphics data may be any appropriate subset of the full set of graphics data required to generate a desired output (e.g. image or texture).

In this embodiment, one or more processing operations 202 (referred to as an "image generating process" in FIG. 1) are performed to generate a group 102 of four sub-regions 112, 113, 114, 115 of the first set of graphics data 100. At this point, the four sub-regions 112, 113, 114, 115 may be stored in a local memory such as a cache.

The processing operations 202 may, for example, be 2D rendering or 3D rendering operations. In an alternative embodiment, the processing operations 202 may comprise post-processing operations. The post-processing operations may be selected from: antialiasing, bloom, blur, colour correction, contrast enhancement, crease, depth of field, edge-detection, fish-eye lens effect, fog effects, glow, grayscale, noise and grain effects, screen overlays, sepia toning, lighting, screen space ambient occlusion, tilt shift, tone mapping, vignetting, chromatic aberration, down-sampling, up-sampling, local sampling, re-projection.

In this embodiment, when performing further graphics processing operations, each sub-region of the second set of graphics data 106 depends not only on the corresponding sub-region of the first set of graphics data 100 but on the corresponding local neighbourhood of sub-regions of the first set of graphics data 100. In particular, in this embodiment, the sub-region 104 in the second set of graphics data 106 depends on the group 102 (or "kernel") of sub-regions that comprises the corresponding sub-region 112 in the first set of graphics data 100 and its three immediate neighbours 113, 114, 115 that are below and to the right of the corresponding sub-region 112. However, in other embodiments, as will be discussed below, each sub-region in the second set of graphics data 106 may depend on a corresponding sub-region in the first set of graphics data 100 and the eight sub-regions surrounding that corresponding sub-region. Other dependencies are of course possible.

The dependency between the first and second set of graphics data may be predetermined and fixed. However, in other embodiments the dependency between the sub-regions of the group 102 and the sub-region 104 of the second set of graphics data 106 may be determined in use. For example the dependency between the first and second sets of graphics data may be identified from the particular further processing operations that are to be performed and/or via a similarity measure e.g. pixel colour, pixel location, or a depth measurement. In some embodiments the dependency information may be made available via an API extension. In another embodiment the dependency information may be made available via firmware for a GPU shader core. In further embodiments the dependency information may be inferred or explicitly specified in software.

Where a dependency is identified and all of the necessary sub-regions of the group 102 have been generated, the sub-region 104 of the second set of graphics data 106 can be generated by performing one or more further processing operations 206 (referred to as an "image post processing process" in FIG. 1) using the sub-regions of the group 102 that are stored in the cache. The further processing operations 206 may comprise one or more of; antialiasing, bloom, blur, colour correction, contrast enhancement, crease, depth of field, edge-detection, fish-eye lens effect, fog effects, glow, grayscale, noise and grain effects, screen overlays, sepia toning, lighting, screen space ambient occlusion, tilt shift, tone mapping, vignetting, chromatic aberration, down-sampling, up-sampling, local sampling, re-projection.

In this embodiment, the sub-region 104 of the second set of graphics data 106 is generated prior to performing one or more processing operations 302 to generate one or more further sub-regions of the first set of graphics data 100. As discussed above, this allows the process of generating the second set of graphics data 106 to commence earlier than would be the case if all of the first set of graphics data 100 were to be generated in advance. This also reduces the amount of the first set of graphics data 100 that needs to be stored in the cache at any one time when generating the second set of graphics data 106.

The one or more processing operations 302 (again referred to as an "image generating process" in FIG. 1) are accordingly then performed to generate one or more further sub-regions 116, 118 of the first set of graphics data 100. At this point, the further sub-regions 116, 118 may be stored in the cache. A further group 108 (or "kernel") of one or more sub-regions 113, 115, 116, 118 may then be used to generate a further sub-region 110 in the second set of graphics data 106 by performing one or more further processing operations 306 (again referred to as an "image post processing process" in FIG. 1).

The process continues in an interleaved manner until all of the sub-regions of the first set of graphics data 100 and all of the sub-regions of the second set of graphics data 106 which are dependent thereon have been generated.

As discussed above, in this embodiment sub-regions from the previous set of graphics data 100 which are required to generate the later set of graphics data 106 may be stored in local memory, e.g. a cache, that is local to the processor, such that there is no requirement to retrieve the data from external memory (e.g. off chip or main memory) when it is required. The data may be removed from the cache once all dependent sub-regions in the later set of graphics data 106 have completed processing. For example, once sub-region 104 of the second set of graphics data 106 has been generated, sub-region 112 of the first set of graphics data 100 is no longer needed and can therefore be removed from the cache (in an embodiment prior to sub-regions 116 and 118 of the first set of graphics data 100 being generated in step 302). However, sub-regions 113, 114 and 115 of the first set of graphics data 100 will be needed to generate further sub-regions of the second set of graphics data 106 and therefore are retained in the cache for the time being (e.g. sub-regions 113 and 115 are needed to generate sub-region 110).

Figure 2:
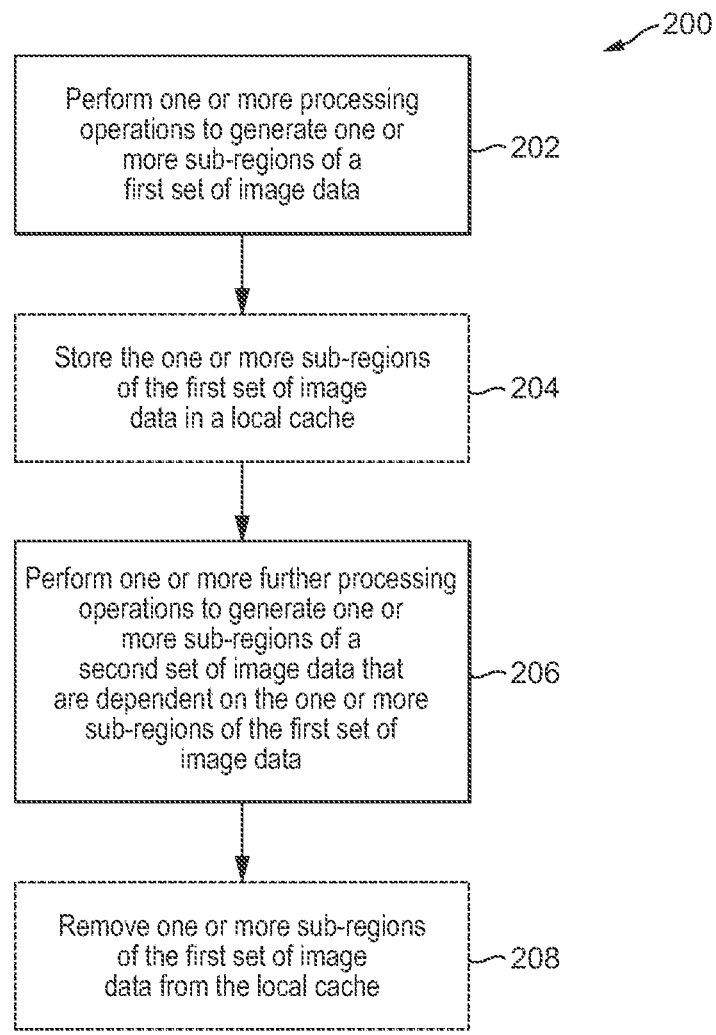
FIG. 2 shows the steps of the method for performing interleaved graphics processing.

FIG. 2 is a flow diagram 200 showing some of the steps of the example method of performing interleaved graphics processing of FIG. 1. As discussed above, at step 202, one or more processing operations are performed to generate one or more sub-regions of the first set of graphics data. In an embodiment the processing operation may be any suitable method for generating an image, for example; 2-d rendering, 3-d rendering, text rendering, procedural image generation or the result of image processing operations from a previous image. In a further example the processing operation may comprise one or more post-processing operations.

One or more further processing operations may then be performed at step 206 to generate one or more sub-regions of a second set of graphics data that are dependent on the one or more sub-regions of the first set of graphics data prior to performing one or more processing operations to generate one or more further sub-regions of the first set of graphics data. In an example the one or more further processing operations may comprise one or more post-processing operations. In an embodiment the one or more further processing operations may be selected from those described with reference to FIG. 1.

As discussed above, during conventional production of a final image, it may be required to read prior graphics data from a buffer, e.g. a frame buffer, multiple times. Storing the graphics data for the entire image in the buffer may be very memory bandwidth and power intensive. In the above described method only the one or more sub-regions of the first of graphics data on which the one or more sub-regions of the second set of graphics data are dependent are generated and need to be stored at any one time and thus memory bandwidth and power consumption can be reduced.

Referring again to FIG. 2, in an embodiment, as discussed above, the one or more sub-regions of the first set of graphics data that the one or more sub-regions of the second set of graphics data are dependent on may, at step 204, be stored in a local cache until processing of all subsequent regions which are dependent on the one or more sub-regions has completed. Storing the one or more sub-regions in the local cache until all dependent processing has completed may remove the need to write the data to a buffer in external memory and then read the data from the buffer and therefore further reduce the memory bandwidth and power consumption.

In some examples, the size of the first set of graphics data can exceed the size of the available local cache since not all of the first set of graphics data needs to be stored at any one time. Accordingly, one or more sub-regions of the first set of graphics data may, at step 208, be removed from the local cache once processing of all of the one or more sub-regions of the second set of graphics data that are dependent on (that will use) those sub-regions of the first set of graphics data has been completed. Removing the data from the cache once the processing of all dependent graphics data has completed enables the local cache to be used for subsequent data while maintaining a reduced local cache size.

Figure 3:
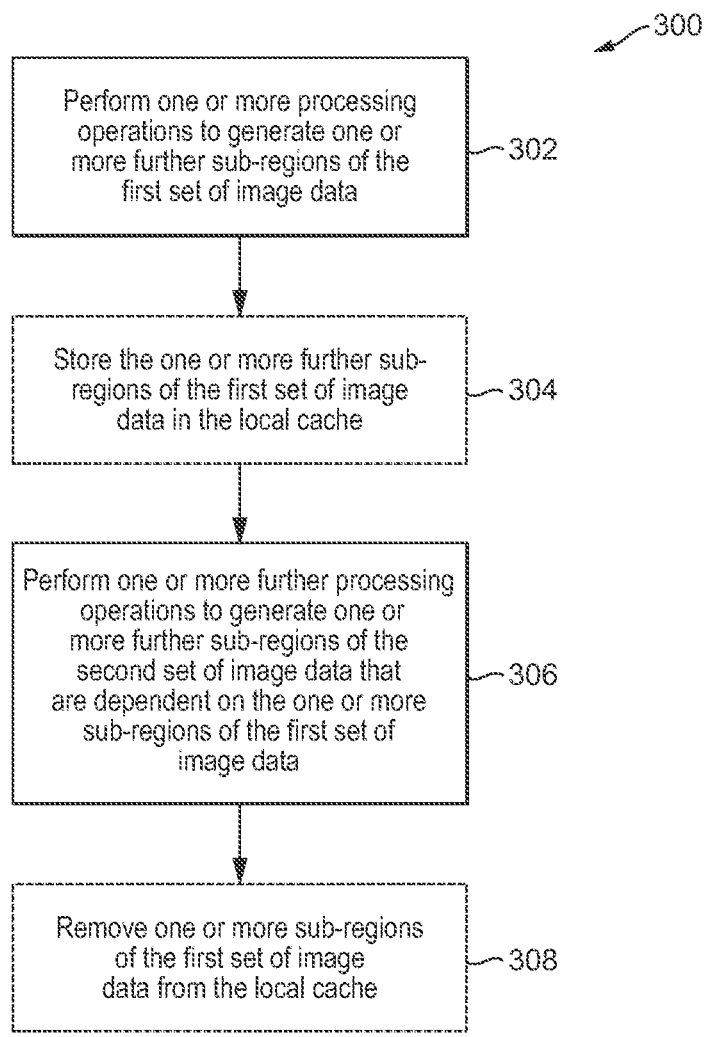
FIG. 3 shows further steps of the method for performing interleaved graphics processing.

FIG. 3 is a flow diagram 300 showing further steps of the example method of performing the interleaved graphics processing of FIGS. 1 and 2. The steps shown in FIG. 3 are performed after the steps shown in FIG. 2.

As discussed above, at step 302, one or more processing operations are performed to generate one or more further sub-regions of the first set of graphics data. One or more further processing operations may then be performed at step 306 to generate one or more further sub-regions of the second set of graphics data that are dependent on the one or more further sub-regions of the first set of graphics data, in an embodiment prior to performing one or more processing operations to generate one or more yet further sub-regions of the first set of graphics data.

Again, the one or more further sub-regions of the first set of graphics data that the one or more further sub-regions of the second set of graphics data are dependent on may, at step 304, be stored in a local cache until processing of all subsequent sub-regions of the second set of graphics data which are dependent on those sub-regions of the first set of graphics data has completed. One or more sub-regions of the first set of graphics data may then, at step 308, be removed from the local cache once processing of all of the sub-regions of the second set of graphics data that are dependent on those sub-regions of the first set of graphics data has been completed.

As discussed above, the process continues in an interleaved manner until all of the sub-regions of the first set of graphics data and all of the sub-regions of the second set of graphics data which are dependent thereon have been generated.

Figure 4:
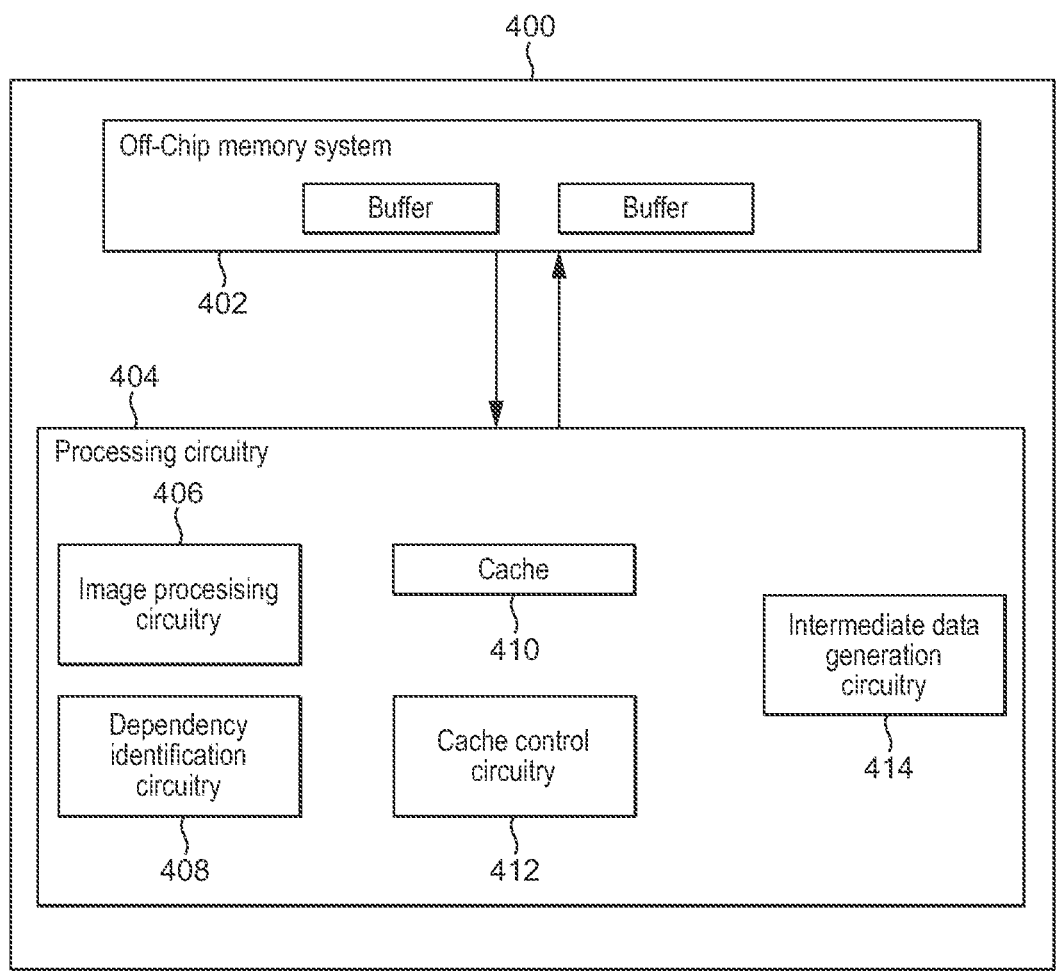
FIG. 4 is an example graphics processing system comprising a graphics processor for performing interleaved graphics processing.

FIG. 4 is a schematic diagram of an example graphics processing system 400 for performing interleaved graphics processing. In an example the system 400 comprises an external (off chip or main) memory system 402 which may comprise one or more, e.g. a plurality of, buffers, for example frame buffers. Processing circuitry 404 of a graphics processor (e.g. a GPU) may comprise graphics processing circuitry in the form of image processing circuitry 406 and dependency identification circuitry 408. It will be understood that the processing circuitry 404 may comprise e.g. programmable shader cores, arithmetic logic etc. or other logic known to those skilled in the art which is not shown in the schematic described here. In an embodiment an example system may comprise a local (on-chip) memory in the form of cache 410 and memory control circuitry in the form of cache control circuitry 412.

The image processing circuitry 406 may be arranged to perform one or more processing operations to generate one or more sub-regions of the first set of graphics data. As noted above with reference to FIGS. 1 and 2 the processing operation may be any suitable method for generating graphics data. In an example the processing operation may be one of those described with reference to FIG. 1 or FIG. 2.

In an embodiment the dependency identification circuitry 408 may be arranged to identify one or more sub-regions of a second set of graphics data that are dependent on the one or more sub-regions of the first set of graphics data.

The image processing circuitry 406 is further arranged to perform one or more further processing operations to generate one or more sub-regions of the second set of graphics data that are dependent on the one or more sub-regions of the first set of graphics data prior to performing one or more processing operations on one or more further sub-regions of the first set of graphics data.

The one or more sub-regions of the first set of graphics data are in an embodiment small enough that they can be cached. Therefore the cache 410 may be arranged to store those one or more sub-regions of the first set of graphics data. Cache control circuitry 412 may be arranged to remove one or more sub-regions of the first set of graphics data from the cache once processing of all of the one or more sub-regions of the second set of graphics data that are dependent on those one or more sub-regions of the first set of graphics data has been completed. As described above, removing the graphics data from the cache once the processing of dependent graphics data has completed enables the cache to be used for subsequent data while maintaining a reduced cache size.

In a further embodiment the dependency identification circuitry 408 may be arranged to identify one or more dependencies between one or more sub-regions of the first set graphics data and one or more sub-regions of a plurality of subsequent sets of graphics data and the image processing circuitry 406 may be further arranged to perform one or more further processing operations to generate one or more sub-regions of the plurality of subsequent sets of graphics data that are dependent on the one or more sub-regions of the first set of graphics data prior to performing one or more processing operations to generate one or more further sub-regions of the first set of graphics data.

In a further embodiment the data processing system 400 may comprise intermediate data generation circuitry 414 arranged to generate one or more sets of intermediate data that may form all or part of the one or more sub-regions of the first set of graphics data. The intermediate data may be needed for no other purpose than generating the second set of graphics data. The dependency identification circuitry 408 may be arranged to identify one or more sub-regions of the second set of graphics data that are dependent on the one or more sets of intermediate data that forms all or part of the one or more sub-regions of the first set of graphics data.

In an embodiment, the cache 410 may be arranged to store the one or more sub-regions of the one or more sets of intermediate data in a local cache and the cache control circuitry 412 may be further arranged to remove the one or more sub-regions of the one or more sets of intermediate data once processing of the one or more sub-regions of the second set of graphics data has been completed. Removal of the sub-regions of the intermediate data once all of the dependent sub-regions of the second or final (output) data has been generated allows the cache 410 to be kept relatively small. The one or more sets of intermediate data may also be prevented from being written out to the external memory system 402 so as further to reduce the amount of bandwidth used.

Figure 5:
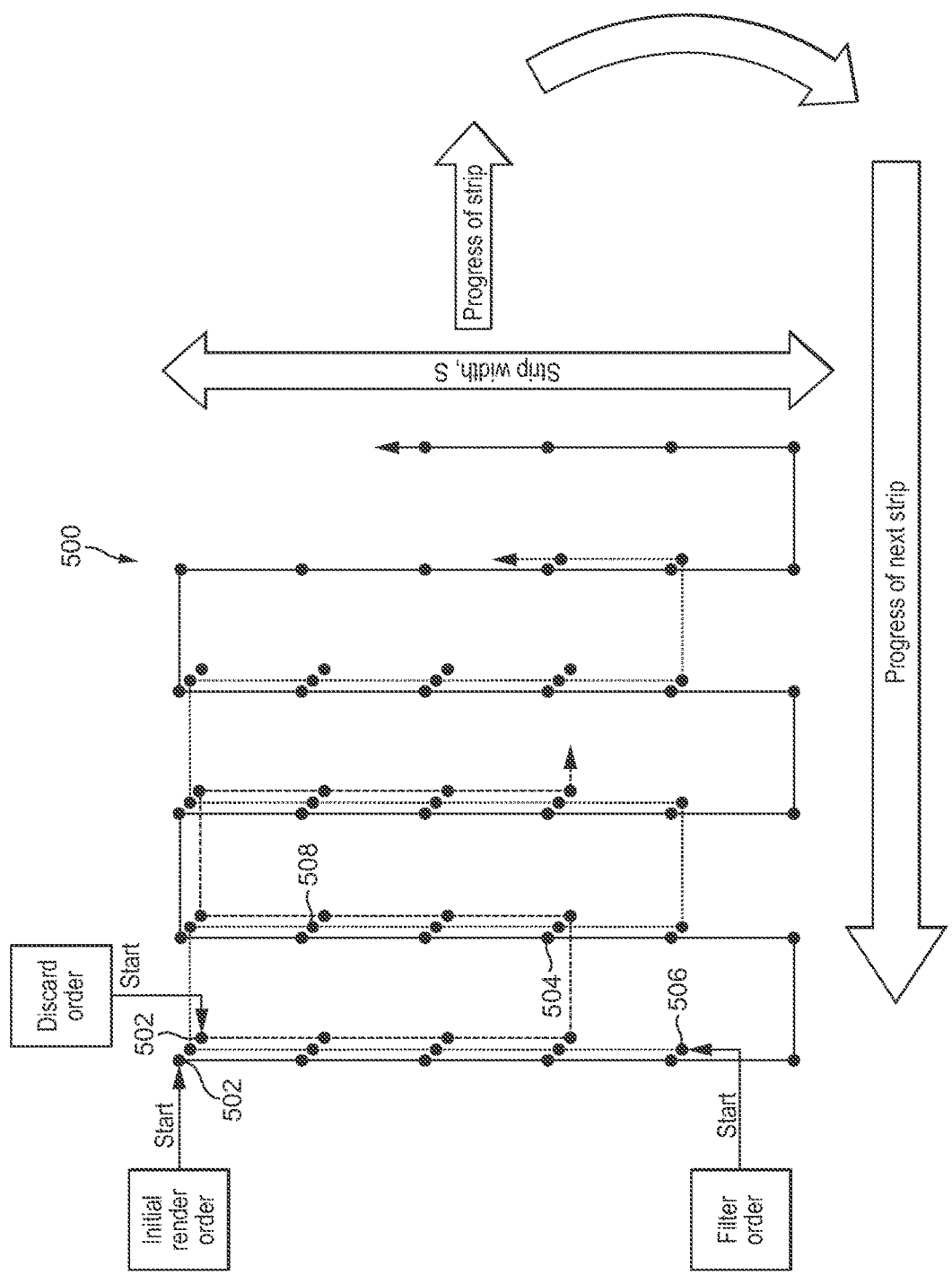
FIG. 5 is an example of a sequence of processing operations on sub-regions of sets of graphics data.

FIG. 5 is an example of a processing order 500 for the interleaved processing operations carried out with respect to sub-regions of first and second sets of graphics data. Each node in FIG. 5 represents a sub-region of a set of graphics data. In this embodiment, each sub-region of a second set of graphics data is dependent on a corresponding sub-region in a first set of graphics data together with each sub-region that surrounds that corresponding sub-region in the first set of graphics data (i.e. up to eight surrounding sub-regions in the first set of graphics data, depending on where the corresponding sub-region is located).

In this embodiment, the processing (render) order for generating the sub-regions of the first set of graphics data comprises a first serpentine processing path (down and up columns of the sub-regions) beginning with sub-region 502. The processing (filter) order for generating the sub-regions of the second set of graphics data comprises a second (counter/opposite) serpentine processing path (up and down columns of the sub-regions) beginning with sub-region 506.

The processing order also proceeds in a serpentine manner along successively lower strips of the graphics data that are S sub-regions wide. In this embodiment, S is 6. As is shown in FIG. 5, progress of the first strip is from left to right, and then progress of the next strip is from right to left. The processing order continues in this serpentine manner along successively lower strips of the graphics data until all of the sub-regions of the sets of graphics data have been traversed. For simplicity, progress along only part of the first strip is shown in detail in FIG. 5.

In this embodiment all of the sub-regions from sub-region 502 along the first path to sub-region 504 of the first set of graphics data are generated via respective processing operations, e.g. as described above. Once this has happened, all of the sub-regions of the first set of graphics data on which sub-region 506 of the second set of graphics data have been generated. Sub-region 506 may then be generated prior to the generation of any further sub-regions of the first set of graphics data that are subsequent to sub-region 504 along the first path. The generation of the first and second sets of graphics data then continues in an interleaved manner following the first and second serpentine paths as indicated in FIG. 5 and back and forth in a serpentine manner along successively lower strips as indicated in FIG. 5.

It should be noted here that, in this embodiment, the processing path for the second set of graphics data is offset from, and therefore turns one sub-region higher than, the processing path for the first set of graphics data. Thus, the next lower strip of the second processing path overlaps the first strip of the first processing path by one sub-region. This is because not all of the data required to generate the sub-regions of the second set of graphics data that are along the bottom row of the first strip has been generated; that data will only be generated when the sub-regions of the first set of graphics data that are along the top of the next strip down have been generated.

In an example where sub-regions of the first set of graphics data are stored in a local cache, those sub-regions may be removed from the local cache in a similar order to that in which the sub-regions of the first set of graphics data are generated. In particular, the processing (discard) order for discarding the sub-regions of the first set of graphics data may comprise a third serpentine processing path (down and up columns of the sub-regions) beginning with sub-region 502. Once sub-region 508 of the second set of graphics data has been generated, sub-region 502 of the first set of graphics data is no longer required and so can be removed from the local cache. The processing order then continues in an interleaved manner following the first, second and third serpentine paths as indicated in FIG. 5 and back and forth in a serpentine manner along successively lower strips as indicated in FIG. 5.

It should again be noted here that, in this embodiment, the third processing path is offset from, and therefore turns two sub-regions higher than, the processing path for the first set of graphics data. Thus, the next lower strip of the third processing path overlaps the first strip of the first processing path by two sub-regions. This is because the sub-regions of the second set of graphics data that are along the bottom row of the first strip and the sub-regions of the second set of graphics data that are along the top row of the next strip down have not been generated, and so the sub-regions of the first set of graphics data that are along the bottom two rows of FIG. 5 are still required to generate those sub-regions of the second set of graphics data.

In the above embodiments, as the sub-regions of the second set of graphics data are generated, they are written out to external memory. Once all of the sub-regions of the second set of graphics data have been generated and written out to external memory, they may then be output, e.g. for display. In these embodiments, as discussed above, if the first set of graphics data is only needed to generate the second set of graphics data (i.e. merely comprises intermediate data), the first set of graphics data may be prevented from being written out to external memory.

In an embodiment the overall sequence of operations may therefore be considered as an interleaving of a number of separate sequences (e.g. processing operations to generate the first set of graphics data, further processing operations to generate the second set of graphics data, and removal from a local cache of the first set of graphics data). In an example the interleaved operations may be an initial render, a filtering operation and a cache purge. In an embodiment the interleaved sequence (e.g. processing order) may be optimized according to the particular operations being executed. The width of the strip used may be dependent on the cache size and the dependency size.

In one embodiment the processing order may be explicitly specified e.g. by firmware or software. In one embodiment, operation in an interleaved manner is based upon a greedy allocation policy e.g. the interleaving is continued until the cache becomes full. In an example the interleaving may be continued until the cache becomes full and then the data processing system may revert to processing the data frame by frame rather than in an interleaved sequence. In an alternative example, operation in an interleaved manner may be determined heuristically (e.g. the largest sets of graphics data may be processed in an interleaved pattern).

The examples herein are described in many cases with reference to a first set of graphics data and a second set of graphics data. However, many processing graphs are more complex than the simple two pass examples provided. The examples described herein may be generalised to multiple levels of dependencies and/or interleaving of multiple sets of graphics data. In an embodiment the multiple dependencies may be described as a chain or an acyclic graph.

The various functions described herein can be carried out in any desired and suitable manner. For example, the functions described herein can be implemented in hardware or software, as desired. Thus, for example, unless otherwise indicated, the various functional elements and "means" may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above a system and pipeline can otherwise include any one or more or all of the usual functional units.

It will also be appreciated by those skilled in the art that all of the described embodiments may include, as appropriate, any one or more or all of the optional features described herein.

The functions described herein may be implemented at least partially using software e.g. computer programs. The functions described herein are intended to encompass software which "describes" or defines the configuration of hardware, such as HDL (hardware description language) software, or for configuring universal programmable chips, to carry out desired functions. Software may comprise computer program code specifically adapted to carry out the functions herein described when installed on a data processor, a computer program element comprising computer software code portions for performing the functions herein described when the program element is run on a data processor, and a computer program comprising code adapted to perform all the steps of a function or of the functions herein described when the program is run on a data processing system. The data processor may be any suitable data processor, for example, a microprocessor system, a programmable FPGA (field programmable gate array), etc.

The examples described herein also extend to a computer software carrier comprising such software which when used to operate a system comprising a data processor causes said data processor to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like or any other suitable means.

The embodiments described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Any range or device value given herein may be extended or altered in an appropriate manner, as will be apparent to the skilled person.

The steps of the methods described herein may be carried out in any suitable order, or simultaneously where appropriate. Additionally, individual blocks may be deleted from any of the methods described herein. Embodiments of any of the examples described above may be combined with embodiments of any of the other examples described to form further examples without losing the effect sought.

It will be understood that the above description is given by way of example only and that various modifications may be made by those skilled in the art. Although various embodiments have been described in detail above, or with reference to one or more individual embodiments, those skilled in the art could make numerous alterations to the disclosed embodiments without departing from the intended scope of the disclosure.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of graphics processing comprising:
   using a set of intermediate graphics data to generate a set of output graphics data, wherein the set of intermediate graphics data and the set of output graphics data are divided into sub-regions;
   the method of using a set of intermediate graphics data to generate a set of output graphics data comprising:
   performing one or more processing operations to generate one or more sub-regions of the set of intermediate graphics data on which one or more sub-regions of the set of output graphics data are dependent;
   storing the generated one or more sub-regions of the set of intermediate graphics data in local memory and permanently preventing the generated one or more sub-regions of the set of intermediate graphics data from being written to external memory;
   performing one or more further processing operations to generate one or more sub-regions of the set of output graphics data using the generated one or more sub-regions of the set of intermediate graphics data prior to performing one or more processing operations to generate one or more further sub-regions of the set of intermediate graphics data;
   after performing the one or more further processing operations to generate one or more sub-regions of the set of output graphics data using the one or more sub-regions of the set of intermediate graphics data:
   performing one or more further processing operations to generate one or more further sub-regions of the set of intermediate graphics data on which one or more further sub-regions of the set of output graphics data are dependent;
   storing the generated one or more further sub-regions of the set of intermediate graphics data in local memory and permanently preventing the generated one or more further sub-regions of the set of intermediate graphics data from being written to external memory; and
   performing one or more further processing operations to generate one or more further sub-regions of the set of output graphics data using the generated one or more further sub-regions of the set of intermediate graphics;
   whereby the process of generating the sub-regions of the set of intermediate graphics data is interleaved with the process of generating sub-regions of the set of output graphics data from sub-regions of the set of intermediate graphics data.

2. A method of graphics processing as claimed in claim 1, the method further comprising:
   removing one or more sub-regions of the set of intermediate graphics data on which the one or more sub-regions of the set of output graphics data are dependent from the local memory:
   once the one or more further processing operations to generate the one or more sub-regions of the set of output graphics data have been completed;
   prior to performing the one or more processing operations to generate the one or more further sub-regions of the set of intermediate graphics data; or
   prior to performing one or more further processing operations to generate one or more further sub-regions of the set of output graphics data.

3. A method of graphics processing as claimed in claim 1, wherein:
the processing order when generating the set of intermediate graphics data or set of output graphics data follows one or more serpentine processing paths over sub-regions of the graphics data.

4. A method of graphics processing as claimed in claim 1, the method further comprising:
following a first processing path over sub-regions of the graphics data when generating the set of intermediate graphics data; and
following a different processing path over sub-regions of the graphics data when generating the set of output graphics data.

5. A method of graphics processing as claimed in claim 1, wherein:
there is an N:1 or 1:N dependency between the one or more sub-regions of the set of intermediate graphics data and the one or more sub-regions of the set of output graphics data, wherein N is a positive integer greater than 1.

6. A method of graphics processing as claimed in claim 1, the method further comprising:
determining the dependency between the one or more sub-regions of the set of intermediate graphics data and the one or more sub-regions of the set of output graphics data.

7. A method of graphics processing as claimed in claim 1, the method further comprising:
determining when the one or more sub-regions of the set of intermediate graphics data on which the one or more sub-regions of the set of output graphics data are dependent have been generated; and
responsive to determining that the one or more sub-regions of the set of intermediate graphics data on which the one or more sub-regions of the set of output graphics data are dependent have been generated, commencing the one or more further processing operations to generate the one or more sub-regions of the set of output graphics data.

8. A method of graphics processing as claimed in claim 1, wherein:
each sub-region of the one or more sub-regions of the set of intermediate graphics data or set of output graphics data is a processing tile of the graphics data.

9. A method of graphics processing as claimed in claim 1, wherein:
the processing operations to generate the one or more sub-regions of the set of intermediate graphics data or the further processing operations to generate the one or more sub-regions of the set of output graphics data comprise rendering operations or post-processing operations.

10. A method of graphics processing as claimed in claim 1, the method further comprising:
performing one or more yet further processing operations to generate one or more sub-regions regions of a third set of graphics data that are dependent on the one or more sub-regions of the set of intermediate graphics data or set of output graphics data:
prior to performing the one or more processing operations to generate the one or more further sub-regions of the set of intermediate graphics data; or
prior to performing one or more further processing operations to generate one or more further sub-regions of the set of output graphics data.

11. A graphics processor for a graphics processing system, the graphics processor comprising:
processing circuitry configured to generate a set of output graphics data using a set of intermediate graphics data, wherein the set of intermediate graphics data and the set of output graphics data are divided into sub-regions; and
a local memory configured to store one or more sub-regions of the set of intermediate graphics data;
wherein the processing circuitry configured to generate a set of output graphics data using a set of intermediate graphics data is configured to generate a set of output graphics data using a set of intermediate graphics data by:
performing one or more processing operations to generate one or more sub-regions of the set of intermediate graphics data on which one or more sub-regions of the set of output graphics data are dependent; and
storing the generated one or more sub-regions of the set of intermediate graphics data in the local memory and permanently preventing the one or more sub-regions of the set of intermediate graphics data from being written to external memory;
performing one or more further processing operations to generate one or more sub-regions of the set of output graphics data using the generated one or more sub-regions of the set of intermediate graphics data prior to performing one or more processing operations to generate one or more further sub-regions of the set of intermediate graphics data;
after performing the one or more further processing operations to generate one or more sub-regions of the set of output graphics data using the one or more sub-regions of the set of intermediate graphics data:
performing one or more further processing operations to generate one or more further sub-regions of the set of intermediate graphics data on which one or more further sub-regions of the set of output graphics data are dependent;
storing the generated one or more further sub-regions of the set of intermediate graphics data in local memory and permanently preventing the generated one or more further sub-regions of the set of intermediate graphics data from being written to external memory; and
performing one or more further processing operations to generate one or more further sub-regions of the set of output graphics data using the generated one or more further sub-regions of the set of intermediate graphics;
whereby the process of generating the sub-regions of the set of intermediate graphics data is interleaved with the process of generating sub-regions of the set of output graphics data from sub-regions of the set of intermediate graphics data.

12. A graphics processor as claimed in claim 11, wherein the processing circuitry is further configured to:
remove one or more sub-regions of the set of intermediate graphics data on which the one or more sub-regions of the set of output graphics data are dependent from the local memory:
once the one or more further processing operations to generate the one or more sub-regions of the set of output graphics data have been completed;
prior to performing the one or more processing operations to generate the one or more further sub-regions of the set of intermediate graphics data; or prior to performing one or more further processing operations to generate one or more further sub-regions of the set of output graphics data.

13. A graphics processor as claimed in claim 11, wherein:
the processing order when generating the set of intermediate graphics data or set of output graphics data follows one or more serpentine processing paths over sub-regions of the graphics data.

14. A graphics processor as claimed in claim 11, wherein the processing circuitry is further configured to:
follow a first processing path over sub-regions of the graphics data when generating the set of intermediate graphics data; and
follow a second different processing path over sub-regions of the graphics data when generating the set of output graphics data.

15. A graphics processor as claimed in claim 11, wherein:
there is an N:1 or 1:N dependency between the one or more sub-regions of the set of intermediate graphics data and the one or more sub-regions of the set of output graphics data, wherein N is a positive integer greater than 1.

16. A graphics processor as claimed in claim 11, wherein the processing circuitry is further configured to:
determine the dependency between the one or more sub-regions of the set of intermediate graphics data and the one or more sub-regions of the set of output graphics data.

17. A graphics processor as claimed in claim 11, wherein the processing circuitry is further configured to:
determine when the one or more sub-regions of the set of intermediate graphics data on which the one or more sub-regions of the set of output graphics data are dependent have been generated; and
responsive to determining that the one or more sub-regions of the set of intermediate graphics data on which the one or more sub-regions of the set of output graphics data are dependent have been generated, commence the one or more further processing operations to generate the one or more sub-regions of the set of output graphics data.

18. A graphics processor as claimed in claim 11, wherein:
each sub-region of the one or more sub-regions of the set of intermediate graphics data or set of output graphics data is a processing tile of graphics data.

19. A graphics processor as claimed in claim 11, wherein:
the processing operations to generate the one or more sub-regions of the set of intermediate graphics data or the further processing operations to generate the one or more sub-regions of the set of output graphics data comprise rendering operations or post-processing operations.

20. A graphics processor as claimed in claim 11, wherein the processing circuitry is further configured to:
perform one or more yet further processing operations to generate one or more sub-regions of a third set of graphics data that are dependent on the one or more sub-regions of the set of intermediate graphics data or set of output graphics data:
prior to performing the one or more processing operations to generate the one or more further sub-regions of the set of intermediate graphics data; or
prior to performing one or more further processing operations to generate one or more further sub-regions of the set of output graphics data.

21. A non-transitory computer readable storage medium storing computer software code which when executing on a processor performs a method of graphics processing comprising:
using a set of intermediate graphics data to generate a set of output graphics data, wherein the set of intermediate graphics data and the set of output graphics data are divided into sub-regions;
the method of using a set of intermediate graphics data to generate a set of output graphics data comprising:
performing one or more processing operations to generate one or more sub-regions of the set of intermediate graphics data on which one or more sub-regions of the set of output graphics data are dependent;
storing the generated one or more sub-regions of the set of intermediate graphics data in local memory and permanently preventing the generated one or more sub-regions of the set of intermediate graphics data from being written to external memory; and
performing one or more further processing operations to generate one or more sub-regions of the set of output graphics data using the generated one or more sub-regions of the set of intermediate graphics data prior to performing one or more processing operations to generate one or more further sub-regions of the set of intermediate graphics data;
performing one or more further processing operations to generate one or more further sub-regions of the set of intermediate graphics data on which one or more further sub-regions of the set of output graphics data are dependent;
storing the generated one or more further sub-regions of the set of intermediate graphics data in local memory and permanently preventing the generated one or more further sub-regions of the set of intermediate graphics data from being written to external memory; and
performing one or more further processing operations to generate one or more further sub-regions of the set of output graphics data using the generated one or more further sub-regions of the set of intermediate graphics data;
whereby the process of generating the sub-regions of the set of intermediate graphics data is interleaved with the process of generating sub-regions of the set of output graphics data from sub-regions of the set of intermediate graphics data.

* * * * *